(No Model.) 5 Sheets—Sheet 1.
J. McCREARY & D. R. SMITH.
MACHINE FOR RADIAL CRIMPING.
No. 336,656. Patented Feb. 23, 1886.
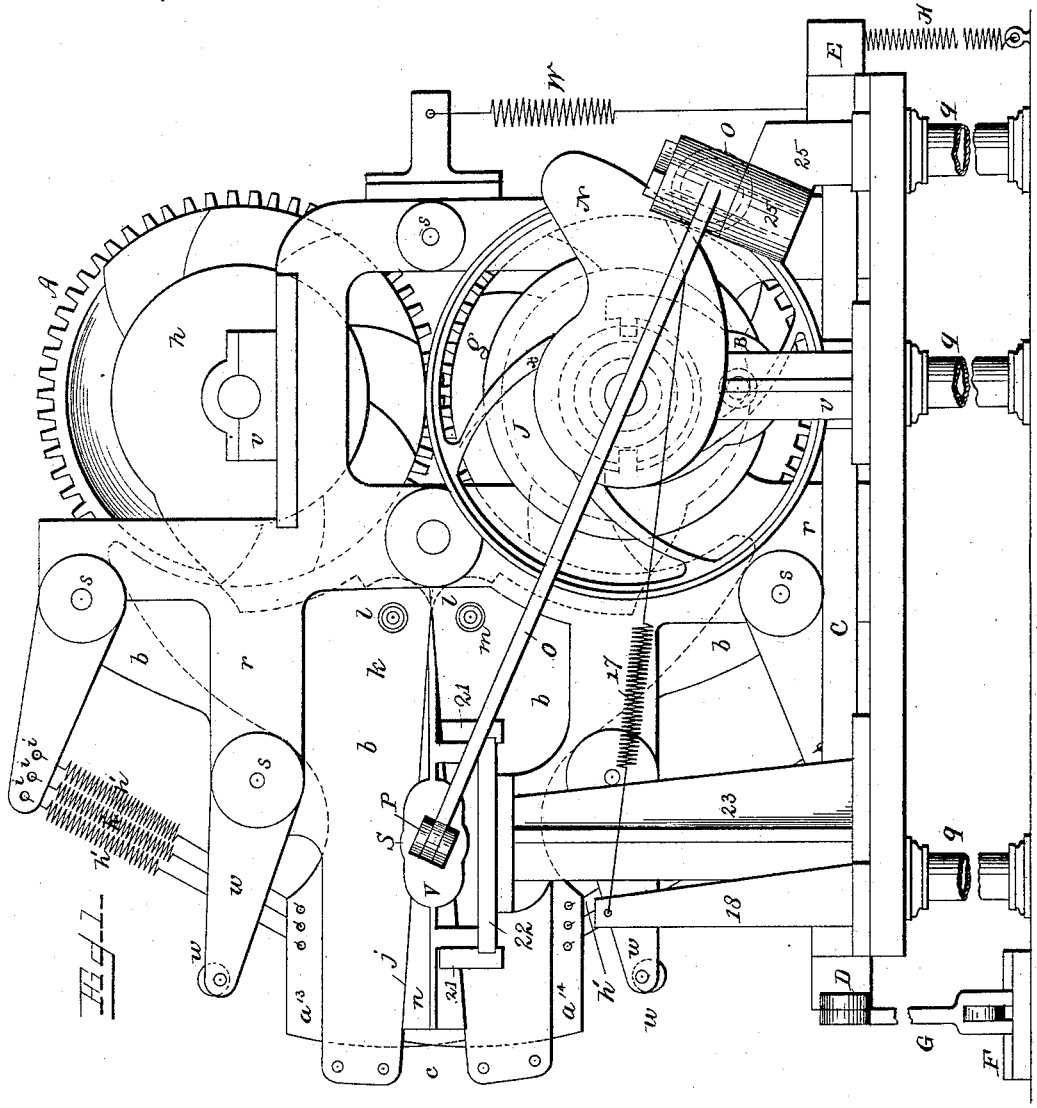
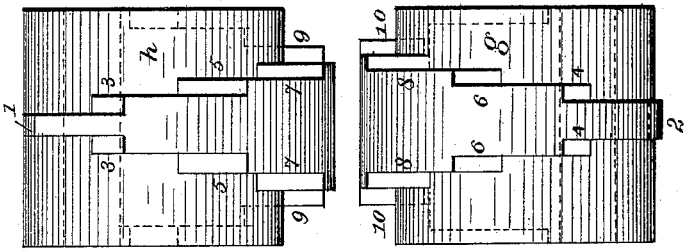
WITNESSES
INVENTORS
John McCreary
David R. Smith
by Attorney (No Model.) 5 Sheets—Sheet 2.
J. McCREARY & D. R. SMITH.
MACHINE FOR RADIAL CRIMPING.
No. 336,656. Patented Feb. 23, 1886.
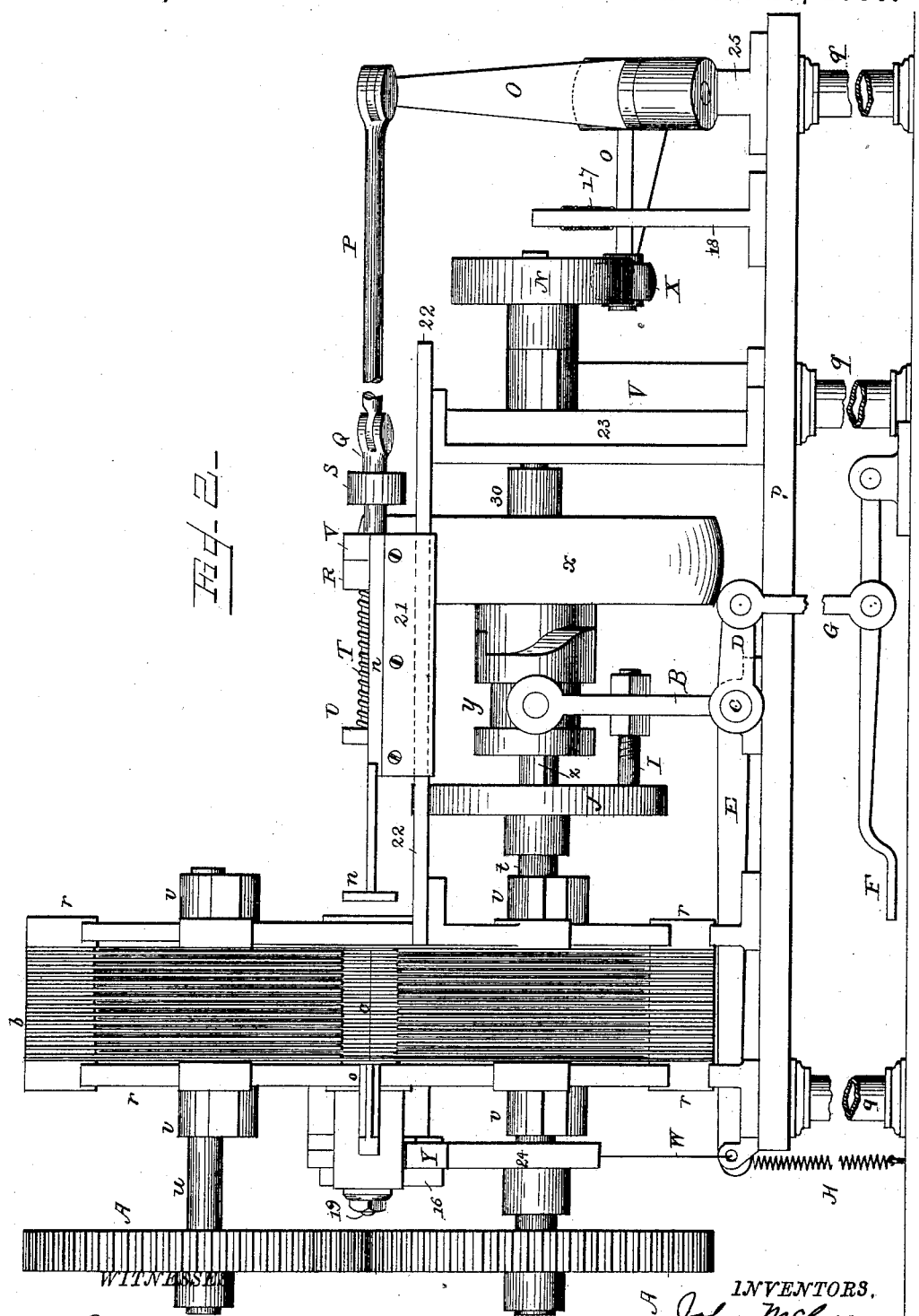
WITNESSES
F. L. Durand,
Rex. M. Smith
INVENTORS.
John McCreary
David R Smith
by A. M. Smith
Attorney
N. PETERS, Photo-Lithographer, Washington, D. C.

(No Model.) 5 Sheets—Sheet 3.
J. McCREARY & D. R. SMITH.
MACHINE FOR RADIAL CRIMPING.
No. 336,656. Patented Feb. 23, 1886.
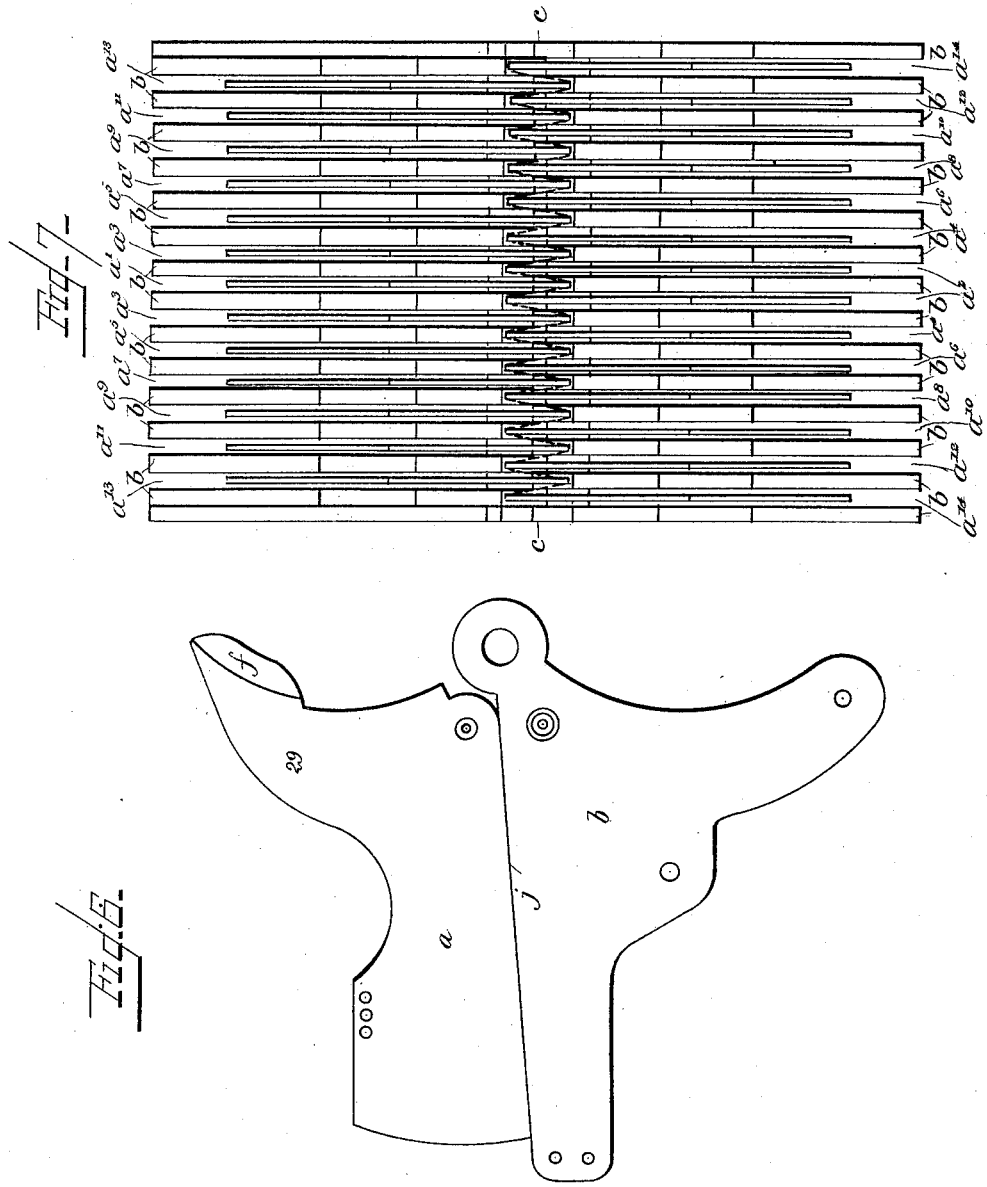

(No Model.) 5 Sheets—Sheet 4.
J. McCREARY & D. R. SMITH.
MACHINE FOR RADIAL CRIMPING.
No. 336,656. Patented Feb. 23, 1886.
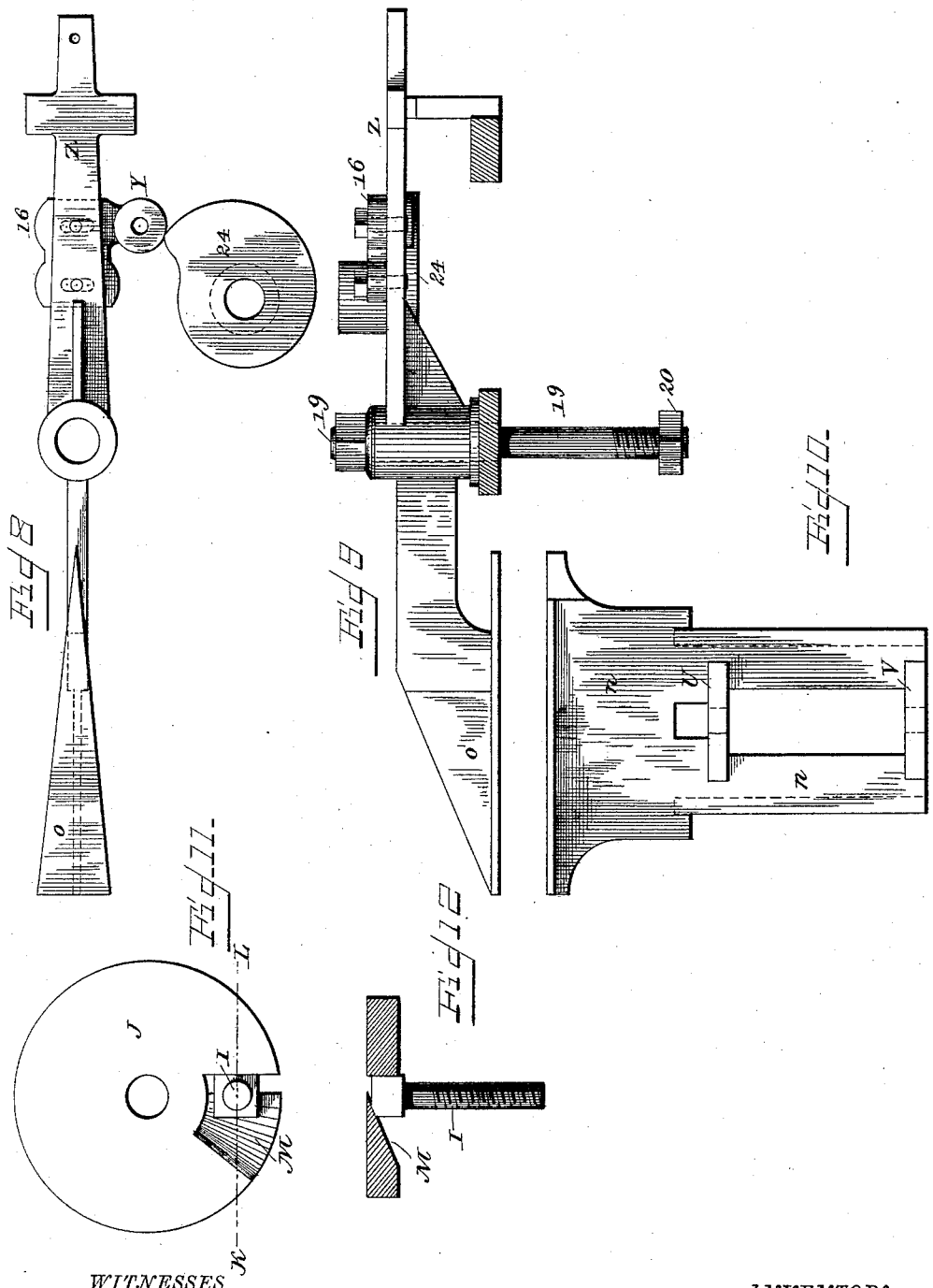
WITNESSES
INVENTORS
John McCreary
David R. Smith
by A. M. Smith
Attorney (No Model.) 5 Sheets—Sheet 5.
J. McCREARY & D. R. SMITH.
MACHINE FOR RADIAL CRIMPING.
No. 336,656. Patented Feb. 23, 1886.
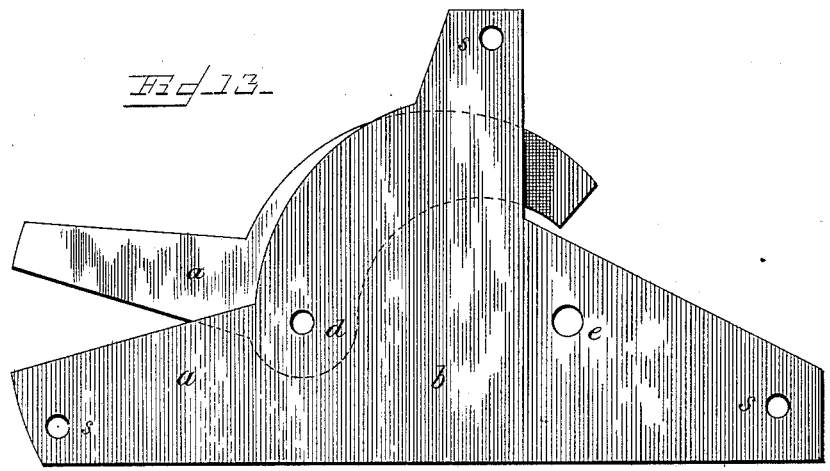
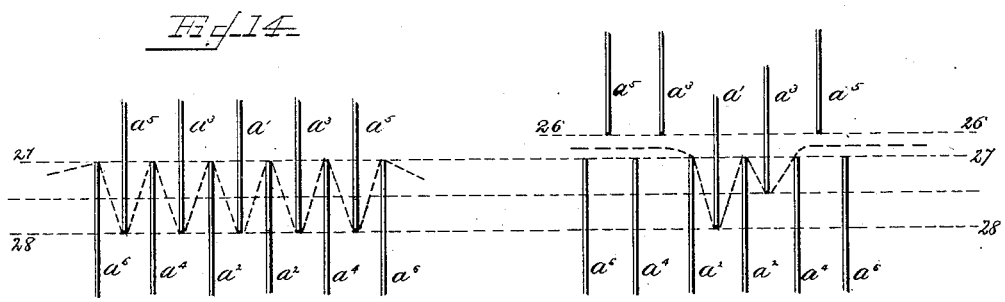
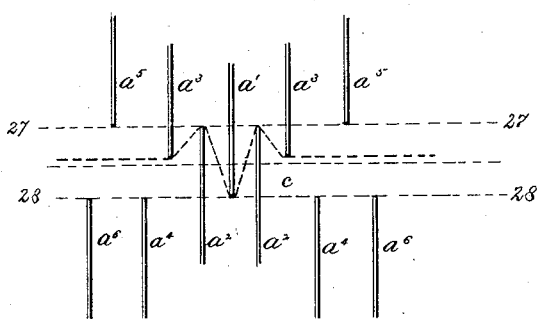
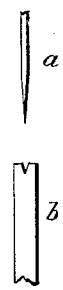
WITNESSES
INVENTORS
John McCreary
David R. Smith
by A. L. Smith
Attorney

UNITED STATES PATENT OFFICE.

JOHN McCREARY AND DAVID R. SMITH, OF COHOES, NEW YORK.

MACHINE FOR RADIAL CRIMPING.

SPECIFICATION forming part of Letters Patent No. 336,656, dated February 23, 1886.

Application filed September 18, 1884. Serial No. 143,408. (No model.)

*To all whom it may concern:*

Be it known that we, JOHN McCREARY and DAVID R. SMITH, both of Cohoes, county of Albany, and State of New York, have invented a new and useful Improvement in Methods of and Machines for Radial Crimping, of which the following is a full, clear, and exact description, reference being had to the accompanying drawings, making part of this specification.

Our invention relates to that class of machines in which the crimps, folds, or fold-marks in filtering-paper or other material are produced by first folding the sheets through the center and then crimping the folded sheets between intermeshing edges.

In the machine for radial crimping described in Letters Patent No. 284,749, dated September 11, 1883, the folded sheets are crimped between radially arranged or diverging intermeshing edges. A series of blades or edge-holders, beginning at one side of the machine and at one edge of the folded sheet, one after another consecutively force the paper against the edges and into the grooves of a stationary bed-plate.

We have found in practice that the radial or diverging arrangement of the intermeshing edges necessitates complexity in design and construction; that the paper is sometimes torn by being forced in between stationary edges. We have also found that the machine above referred to does not, and that other machines heretofore used do not, complete the crimping or folding of filtering-paper; that the paper, after leaving such machines, must be subjected to further operations of handling or pressing in order to perfect the folds and render them sufficiently permanent. We have found, also, that besides the time occupied by the moving edges in acting one at a time, as in the machine first above referred to, a difficulty is experienced in so placing the paper that the first and last folds will be made of equal width.

The object of our invention is to provide a machine of improved design and construction by which filtering-paper may be crimped or folded without injuring the paper, and which will, without further handling or pressing of the paper, complete the folds or crimps and render them sufficiently permanent, and by means of which the paper may be more rapidly and evenly crimped or folded.

In the accompanying drawings, Figure 1 is a side elevation of a machine for radial crimping embodying our invention. Fig. 2 is a front elevation of the same machine. Figs. 3 to 12, inclusive, represent details of same. Fig. 13 represents certain modified details of the invention. Figs. 14, 15, and 16 are diagrams illustrating the operation of the intermeshing edges. Fig. 17 is a further illustration of details.

$a\ a\ a$, &c., indicate the intermeshing blades or edge-holders, and also indicate the working or intermeshing edges of the respective blades. Of the blades or edges $a$, those which act simultaneously are indicated by the same number, as $a^2 a^3$, &c. The blades should be knife-edged and smooth, but not sharp enough to cut the paper or material.

$b\ b$ are the stop guide-partitions, which serve to separate the blades sufficiently to allow for the thickness of the paper or material, serve to guide and steady the blades, and, projecting between the working-edges, they form stops, which retain the paper in the wedge-shaped space $c$. The stop guide-partitions may be grooved to receive the paper forced into them by the edges $a$, as shown in Fig. 17; but such grooves are unnecessary when the paper is to be pressed automatically within the space $c$.

In the modification of this invention indicated in Fig. 13 the lower blades or edge-holders $a$ are stationary, and are projecting parts of the guide-partition $b$ in that figure. This modification of the invention has been and is now employed by us in certain radial crimping necessary in the manufacture of wearing-apparel. The moving blades $a$, Fig. 13, are hinged by a rod passing through the holes $d$. The cam-shaft passes through holes $e$, and the edge of the cloth or fabric is crimped between an upper and a lower series of intermeshing edges $a$. The upper and lower blades $a$ in Fig. 13 overlap more toward the axle $d$ than toward the point or outer extremity of the blades, while those of Figs. 1 and 2 overlap more at the ends—that is, at the entrance of the space $c$—than farther in, corresponding in that overlap to the width and form of fold required in filtering-paper.

$f f$ are wearing-pieces attached to the blade-arms, where they are acted on by the cams $g$ and $h$, which cams throw the intermeshing edges $a$ against the paper and crimp it.

$h'\ h'$ are suitable springs so attached to the blades $a$ and to a fixed point, $i$, that by their action they withdraw the blades from the folded paper until they come to a state of rest against a suitable stop, which stop may be the cylindrical part of the cams $g$ and $h$, allowing the edges $a$ to be withdrawn until they are flush with the stop faces or edges $j$ of the stop-guide partitions $b$, thereby forming the wedge-shaped space $c$. The sheets of filtering-paper are first folded through the center, then placed with the folded edge inward, resting on the edges $a$ of the lower blades $a$, and on the lower stop-faces, $j$, which edges and faces form the lower wall of the wedge-shaped space $c$.

The blade $a'$ first comes down onto the folded sheet on the line of the middle fold or fold-mark across the middle of the sheet. Then the edges $a^2$ move upward against the under side of the paper. After the edges $a^2$ have completed their upward movement the edges $a^3$ move downward, and so on successively and in the order of the folds consecutively from the middle each way until all the folds are completed.

The upper blades $a$ are hinged at $k$ by a transverse rod passing through a hardened steel bush, $l$, and the lower blades $a$ are hinged in a similar manner at $m$; but we do not confine ourselves to the devices for guiding and moving the blades or edge-holders $a$ shown in the drawings, but employ any suitable means for guiding and moving the intermeshing edge-holders and edges $a$, provided the moving edges $a$ move in parallel planes and overlap each other in the manner indicated, corresponding to the width and form of the folds required in radial crimping. When the blades $a$ are withdrawn from the folds, the crimped paper is held in the wedge-shaped space $c$ until suitable presser-plates, $n$ and $o$, automatically compress it within the space $c$, and automatically throw it out when so compressed.

$p$ is the bed-plate, supported at a convenient height above the floor by suitable supports, $q$.

$r\ r$ are side frames bolted to bed-plate $p$. Between the partition-plates washers are placed of a suitable thickness, and short bolts passing through suitable openings, $s$, and through the washers and partition-plates, fasten the whole rigidly together, giving space for the free movements of the blades $a$.

The shafts $t$ and $u$ of the driving-cams are carried by suitable bearings, $v$, attached to projections on the side frames or bed-plate.

$w\ w$ are adjustable eccentric stops, (shown in Fig. 1 only,) to be employed, if required, instead of employing the cylindrical part of the cams $h$ for that purpose, to limit the withdrawal of the blades $a$.

Motion is imparted to the machine by the band-wheel $x$, which engages the clutch $y$, which drives the axle $t$, by the spline $z$. The shaft $u$ is driven from the shaft $t$ by the pair of spur-wheels A, of equal diameter and pitch.

In Figs. 3 and 4 the lateral or horizontal scale is exaggerated to give clearness to the drawings, and the working-faces of the cams are numbered, the numbers corresponding with the numbers of the respective blades $a$.

B is the clutch-shipper, attached to a rock-shaft, C, having arms D and E. Arm D is connected to treadle F by means of rod G. A spring, H, connects the outer extremity of arm E with the floor, the arrangement and adjustment being such that pressure on the treadle causes the clutch to engage suitable projections on the hub of pulley X, and the contraction of the spring H withdraws the clutch when the treadle is released.

The arrangement and adjustment of all the parts are such that a sheet of paper is crimped, pressed, and thrown out during a single revolution of the shafts $t$ and $u$.

I is a suitable clutch-pin projecting from the shipper B.

J is a stop-plate, of which a face view is shown in Fig. 11 and a sectional view in Fig. 12 on the line K L of Fig. 11. In stop-plate J is a notch or recess, M, the form of which is clearly shown in Figs. 11 and 12. When the projecting end of clutch-pin I can enter the notch M, if no pressure is on the treadle, the clutch will release the pulley X and the machine come to a state of rest. If pressure be then applied to the treadle, causing the clutch to engage the wheel X, the axle will begin a revolution, the end of pin I will be driven along the slanting side of the notch and then ride on the face of the stop-plate until the revolution is completed, when it will again drop into the notch, causing the machine to again come to a state of rest until started again by pressure on the treadle. During the revolution, after the edges $a$ have withdrawn from the paper, the cam N, acting through the bell-crank O, and rods P and Q, forces the presser-plate $n$ into the space $c$, compressing the paper against the opposite presser-plate, $o$. On the rod Q are two collars, R and S, and a spiral spring, T. The thrust of rod Q compresses the spring T between collar R and a projection, U, on the sliding shank or stem of the presser-plate until collar S comes in contact with projection V, secured to plates 21, the shank of the presser-plate sliding in the hollow rod Q and between the plates 21. After the presser-plate $n$ has completed the stroke compressing the paper, the presser-plate $o$ is thrown upward by the action of spring W, leaving the paper free to escape. The paper is thrown out by a quick further movement of presser-plate $n$, caused by the action of the spring T, when said plate is relieved from the resistance of presser-plate $o$.

X and Y are friction-rollers. The friction-roller Y is attached to vibrating arm Z of presser-plate $o$ by an adjustable holder, 16. Friction-roller X is held against the face of cam N by a suitable spring, 17, connected with an arm of the bell-crank and with a fixed support, 18. Presser-plate $o$ swings upon a stud-bolt, 19, which passes through the side frames, partition-plates, and washers, and is secured by a nut, 20. Presser-plate N is guided by plates 21, which slide on the edges of guide-plate 22. 23 is the guide-plate support. Friction-roller Y is held against cam 24 by the spring W. The downward or closing movement of presser plate o is secured by the action of cam 24 on friction-roller Y. 25 is a stand or bearing-piece for bell-crank O.

Fig. 7 is a front view of the partition-plates $b$ and blades $a$, the lateral or horizontal scale being exaggerated for the sake of clearness in the drawings. In that figure the parts are in the position just before the blades are withdrawn, leaving the paper in the space $c$. The paper in Fig. 7 is shown by a dotted line. When the blades are withdrawn, the paper cannot escape from space $c$ above or below, and is so held in that space until compressed and thrown out, as specified.

The diagrams, Figs. 14, 15, and 16, represent transverse vertical sections of the parallel blades and edges $a$. If the lower blades were fixed in the positions shown in Figs. 14 and 15, and the upper blades only in those figures were movable, opening between the lines 26 and 27 to receive the paper or other material to be operated on, the blade $a'$ in moving down would force the paper in between edges $a^2$ and $a^2$, blade $a'$ would not move about on the paper, would remain on the line of first contact, while the paper would be drawn over edges $a^2$ and $a^2$. After $a'$ had reached its lowest position, holding the paper, when $a^3$ should move down, there would be as much friction, drag, and strain on the paper where it rendered or dragged over edge $a^4$, Fig. 15, as where it dragged over $a^2$ in the same figure, and there would be much more than twice as much dragging, bending, and strain over the edge $a^3$ in forcing the paper in between edges $a^2$ and $a^4$ of the same figure, 15, than over either of the other edges named. This extra or more than double strain or drag on the paper we avoid entirely in this invention by having both the upper and lower blades $a$ move in the order indicated by the letters and numbers $a'$ $a^2$ $a^3$, &c., as hereinbefore specified, and as further illustrated in Fig. 16, in which blades $a'$, $a^2$ and $a^2$ have completed their movement in on the paper, and blades $a^3$ are moving down. By thus reducing the excessive strain on the paper softer and better filtering-paper may be crimped.

29 are the blade arms by which, in the illustrations of this invention shown in the drawings, the blades are operated from the driving-cams.

Instead of cams $g$ and $h$, any suitable device—such as cranks or eccentrics—may be employed for imparting a suitable reciprocating or vibrating motion to the edges or blades $a$.

Although we have referred to the actuating-cams $g$ and $h$ as two cams on the axles $t$ and $u$, it is evident that there is a cam for each blade $a'$ $a^2$ $a^3$, &c., and that they may be arranged either on one axis or on several axes, according as arms 29 and other details are varied in form and construction, and therefore in referring to cams $g$ and $h$ we refer to the series, however arranged.

30 is a collar against which the hub of driving-pulley X bears.

Instead of the means described for moving the shipper B, any usual or suitable device may be employed for that purpose.

Having now described our invention, we claim as new—

1. In a machine for radial crimping, a series of intermeshing blades arranged to move in parallel planes and to overlap in forming the crimps to correspond with the increasing or diminishing width of fold required in radial crimping.

2. In a machine for radial crimping, a series of intermeshing blades arranged to move in parallel planes and to pass by or interlap in forming the crimps to correspond with the increasing or diminishing width of fold required for radial crimping, in combination with the suitable cams for actuating said blades, arranged to operate first upon the central blades, and thence toward the sides of the series in consecutive order.

3. In a machine for radial crimping, a series of intermeshing blades, all arranged to move in parallel planes and to act alternately and successively against opposite sides of the paper to form the crimps consecutively, the overlap of the intermeshing blades corresponding to the increasing or diminishing width of fold required in radial crimping, in combination with suitable cams for actuating said blades.

4. In a machine for radial crimping, a series of intermeshing blades, all arranged to move in parallel planes and to overlap to conform to the increasing or diminishing width of fold required in radial crimping, in combination with cams for operating said blades alternately and successively from opposite sides, forming the crimps consecutively, and stops for holding said blades when withdrawn, substantially as described, whereby a wedge-shaped space, $c$, is formed between the opposing edges, in which space the crimped paper is held.

5. In a machine for radial crimping, a series of intermeshing blades, all arranged to move in parallel planes and to overlap to conform to the increasing or diminishing width of fold required for radial crimping, in combination with suitable cams for actuating said blades alternately and successively from opposite sides and to form the crimps consecutively, stops for holding said blades when withdrawn for forming a wedge-shaped space between the opposing edges, and a suitable clamp or presser-plates for compressing the crimped paper in said space, substantially as described.

6. In a machine for radial crimping, a series of intermeshing blades, all arranged to move in parallel planes and to overlap to conform to the increasing or diminishing width of fold required for radial crimping, in combination with cams $g$ and $h$, for actuating said blades alternately and successively from opposite sides for forming the crimps consecutively, stops for holding said blades when withdrawn for forming a wedge-shaped space between the opposing edges, and a suitable clamp or presser-plates, $n$ and $o$, for compressing the paper in said space, arranged to automatically eject the crimped paper after the same has been compressed.

7. In a machine for radial crimping having a series of intermeshing blades adapted to form, when withdrawn from action on the paper, a wedge-shaped space, $c$, between the opposing edges, the swinging presser-plate $o$, in combination with a suitably-guided sliding presser-plate, $n$, arranged and operating to compress the crimped paper, substantially as described.

8. In a machine for radial crimping having a series of intermeshing blades adapted to form when withdrawn from the paper, a wedge-shaped space, $c$, between the opposing edges, the combination of the swinging presser-plate $o$, and a suitably-guided sliding presser-plate, $n$, for compressing the crimped paper, and a spring for automatically ejecting the same, substantially as described.

In testimony whereof we have hereunto set our hands this 15th day of September, A. D. 1884.

JOHN McCREARY.
DAVID R. SMITH.

Witnesses:
SAML. H. EDGERLY,
A. D. CARPENTER.